(No Model.) 4 Sheets—Sheet 2.
C. BURGHER.
TESTING APPARATUS FOR ELECTRIC AUTOMATIC SYSTEMS.
No. 578,077. Patented Mar. 2, 1897.

WITNESSES.
Matthew M. Blunt
J. Murphy

INVENTOR.
Charles Burgher
by Jas. H. Churchill
ATT'Y.

UNITED STATES PATENT OFFICE.

CHARLES BURGHER, OF NEWTON, MASSACHUSETTS, ASSIGNOR TO THE BOSTON AUTOMATIC FIRE ALARM COMPANY, OF PORTLAND, MAINE.

TESTING APPARATUS FOR ELECTRIC AUTOMATIC SYSTEMS.

SPECIFICATION forming part of Letters Patent No. 578,077, dated March 2, 1897.

Application filed December 17, 1896. Serial No. 615,984. (No model.)

*To all whom it may concern:*

Be it known that I, CHARLES BURGHER, residing in Newton, in the county of Middlesex and State of Massachusetts, have invented an Improvement in Testing Apparatus for Electric Automatic Systems, of which the following description, in connection with the accompanying drawings, is a specification, like letters on the drawings representing like parts.

This invention relates to a testing apparatus especially adapted for use in buildings equipped with an automatic electric protective system, and more particularly an automatic fire-alarm system of the character known as the "Watkins" system. In buildings equipped with the Watkins automatic fire-alarm system each floor of the building is provided with what is known as a "floor-circuit," which, in accordance with this invention, leads to a circuit-controller of novel construction, as will be described, and the various floor-circuits coöperate with a main circuit extended throughout the building, with its branches or loops running substantially parallel to the floor-circuits and connected to said floor-circuits by thermostatic instruments, usually normally open.

The circuits of the system are usually tested by a watchman or other person during predetermined intervals of time, usually once in twenty-four hours, and it is the object of this invention to provide an efficient, compact, and cheap testing apparatus by which each floor-circuit may be tested and the test recorded if made with the circuit in its operative condition.

The apparatus also includes a ground-test, as will be described, which test is also preferably recorded if a ground on the line does not exist, as will be described.

The testing apparatus is located in a casing provided with a door normally locked, and the said door controls an audible signal which responds to the opening of the door, and the said audible signal is also governed by a manually-operated circuit-controller, as will be described.

These and other features of this invention will be pointed out in the claims at the end of this specification.

Figure 1:
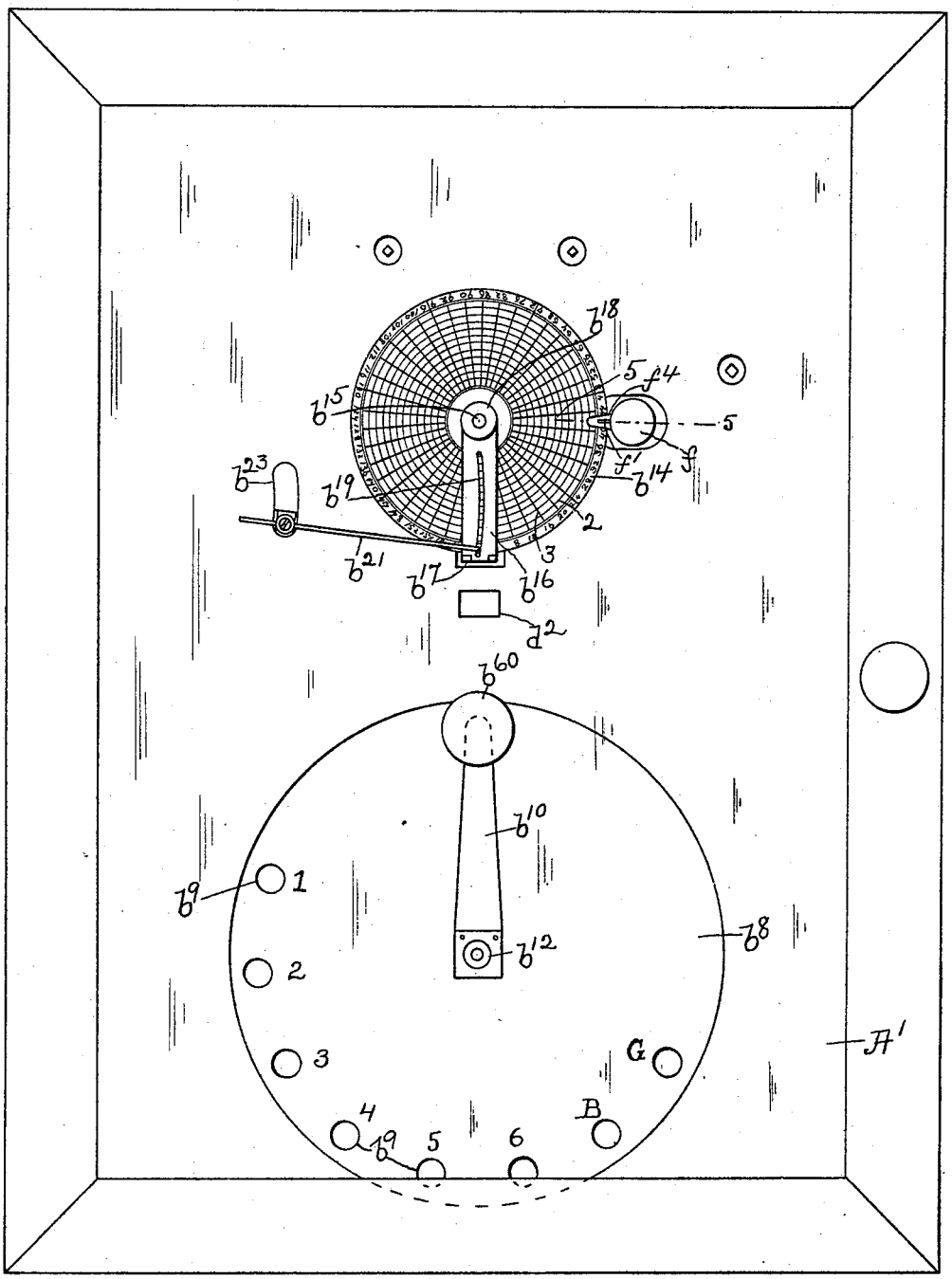
Figure 2:
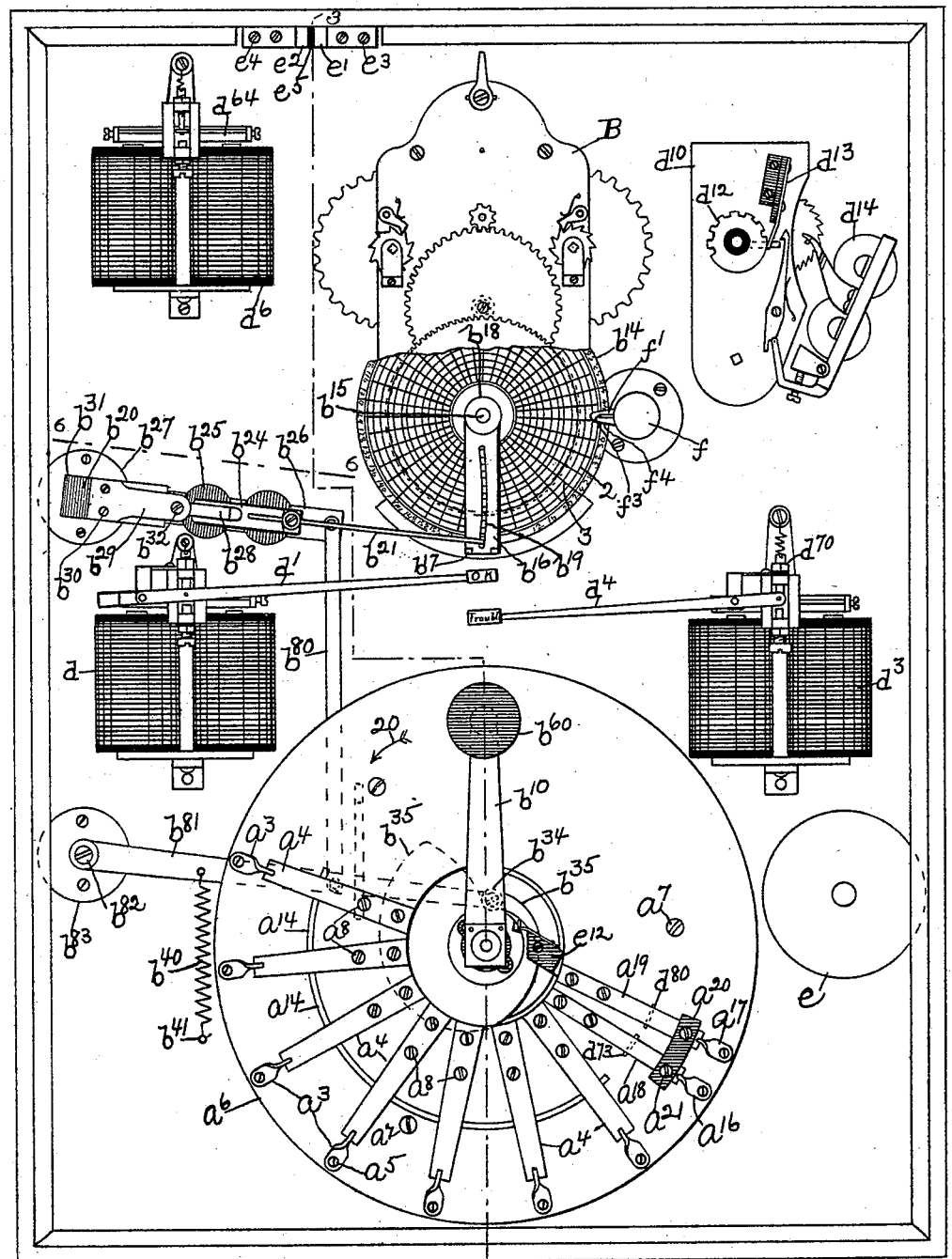
Figure 3:
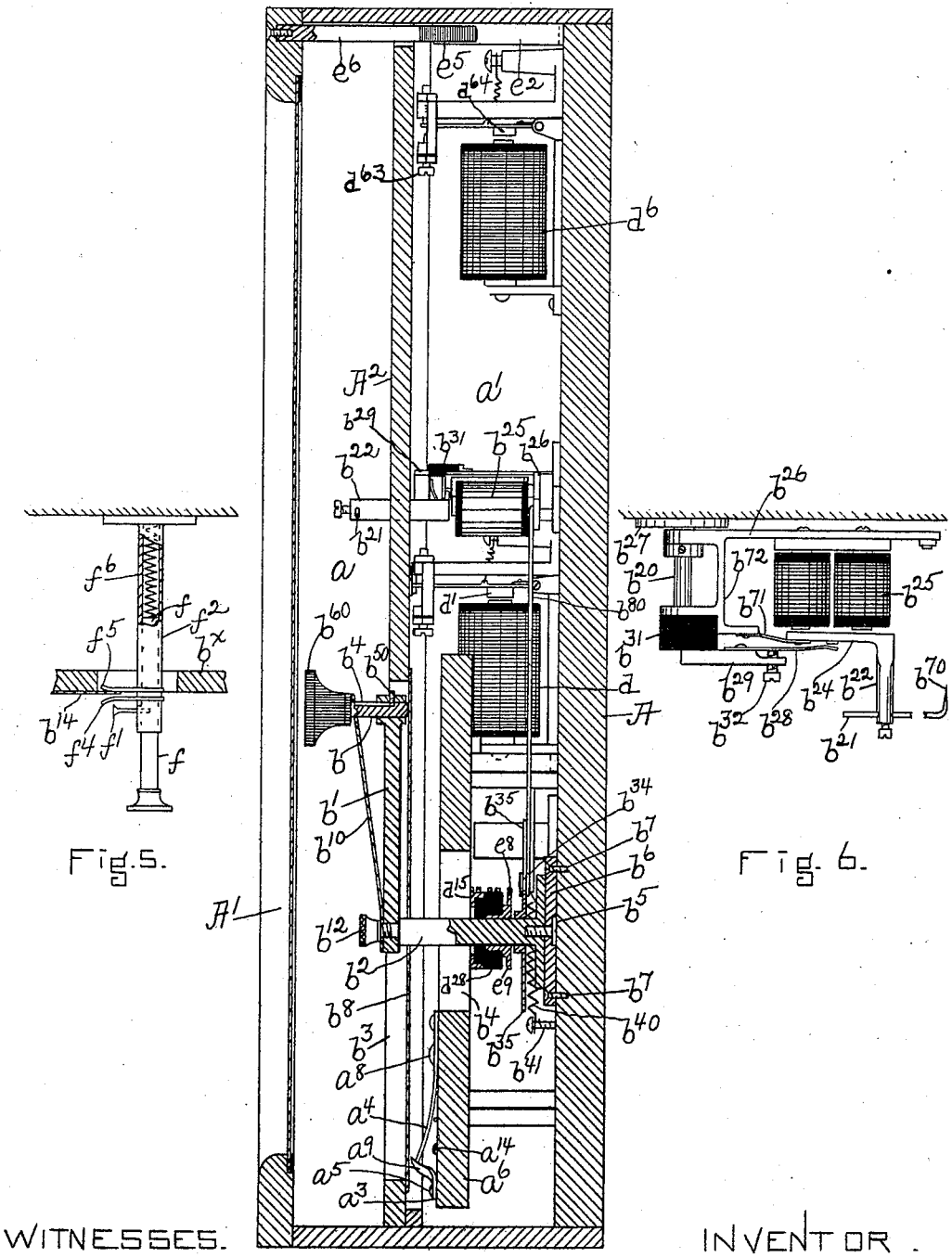

Figure 1 is a front elevation of a testing apparatus embodying this invention; Fig. 2, a front elevation of the testing apparatus shown in Fig. 1 with the inner cover for the casing removed; Fig. 3, a section of the apparatus shown in Fig. 1 on the irregular line 3 3, Fig. 2, looking toward the left; and Fig. 4, a diagram of circuits to illustrate the working of the apparatus shown in Figs. 1 and 2. Figs. 5 and 6 are details to be referred to.

The operative parts of the testing apparatus forming the subject of this invention are and may be contained in a suitable casing or normally-closed framework A, (see Fig. 3,) provided with a preferably glass door A' and with a removable partition or wall $A^2$, which divides the said casing into two chambers $a$ $a'$. The chamber $a'$ is designed to contain the greater portion of the operative parts of the apparatus, which comprise a circuit-controller of novel construction, as will be described, and electromagnets, the purpose of which will be more fully explained. The circuit-controller referred to consists, as herein shown, of a series of circuit-terminals corresponding to the number of floors equipped or wired with the automatic circuit-controllers or thermostats represented in Fig. 4 by the substantially small circles $a^2$ and additional circuit-terminals, the purpose of which will be hereinafter set forth.

The floor-circuit terminals are herein shown as seven in number (see Fig. 4) and each comprises a stationary member $a^3$ and a movable member $a^4$, the said stationary member being secured, as by a screw $a^5$, to a disk, block, or support $a^6$, of insulating material, suitably fastened, as by screws $a^7$, (see Figs. 2 and 3,) to the back of the casing A. The movable member $a^4$ of the floor-circuit controllers may be made as herein shown, and consists of a metal strip or spring fastened at one end, as by screws $a^8$, to the insulating-disk $a^6$, the free end of said spring normally projecting away from the support or disk $a^6$ and engaging a finger $a^9$ on the fixed member $a^3$. The fixed member $a^3$ of the floor-circuit controller has connected to it one branch wire $a^{12}$ of the floor-loop, and the other branch $a^{13}$ of the said loop is connected to the movable member $a^4$. The floor-circuit controllers are arranged radially on the disk $a^6$, and the movable members of the floor-circuit controllers coöperate with a circuit-terminal $a^{14}$, common to them all and represented as an arc-shaped metal bar, rod, or strip, suitably fastened to the supporting-disk $a^6$. The disk $a^6$ has also secured to it an additional circuit-controller comprising a fixed member $a^{16}$ and movable members $a^{18}$ $a^{19}$, the latter of which are connected, as shown, by a bar $a^{20}$, of insulating material, secured to the members $a^{18}$ $a^{19}$, as by screws $a^{21}$.

The movable members $a^4$ of the circuit-controlling device referred to have coöperating with them an actuating device movable in the arc of a circle and herein shown as a movable plunger or rod $b$, (see Fig. 3,) carried by an arm or pointer $b'$, fast on a shaft $b^2$, which is extended through an opening $b^3$ in the partition-wall $A^2$, as herein shown, and through an opening $b^4$ in the disk or insulating-support $a^6$, the said shaft being mounted in bearings at its opposite ends, and in the present instance the rear end of the said shaft is provided with a screw $b^5$, which is rotatably supported in a bearing-plate $b^6$, fastened to the rear wall of the casing A, as by screws $b^7$. The front end of the shaft $b^2$ is extended through a suitable hole in a disk or plate $b^8$, preferably of metal, and which covers the opening $b^3$ in the partition-wall $A^2$, the said disk being secured to the said partition-wall in any desired or suitable manner. The disk $b^8$ is provided with a series of holes or openings $b^9$, arranged in the arc of a circle, as represented in Fig. 1, and marked "1" to "6," inclusive, and "B" to "G," for a purpose as will be described. The holes $b^9$ in the disk $b^8$ are made of suitable size and shape to permit the actuating rod or plunger $b$ to be inserted through them and into contact with the movable members $a^4$ of the floor-circuit controllers and with the movable members $a^{18}$ $a^{19}$ of the additional circuit-controller carried by the insulating-support or disk $a^6$.

In the present instance the plunger $b$ is represented as provided with a longitudinal slot or groove $b^4$, into which is extended a pin or screw $b^5$, carried by the arm or pointer $b'$, and the said rod is also represented as provided with a head or thumb-piece $b^{60}$. The plunger $b$ is normally withdrawn from the openings $b^9$ in the disk $b^8$, so that its end clears the disk $b^8$ and permits the arm $b'$ to be moved in the arc of a circle with the shaft $b^2$ as a center, the said push rod or plunger $b$ being moved in an outward direction by a suitable spring, herein shown as a flat spring $b^{10}$, having one end engaging the head $b^{60}$ and the other end fastened to the arm $b'$, as by the nut or screw $b^{12}$. The plunger $b$ constitutes an actuating device for the circuit-controllers and is located in the chamber $a$ of the casing, and is rendered accessible by opening the door $A'$ of the said casing.

The casing A is provided with a registering mechanism, which will be hereinafter described, and with a recording-surface, herein shown as a paper or other disk or dial $b^{14}$, provided with suitable graduations, herein shown as concentric circles 2 and radial lines 3, forming a series of radially-arranged spaces representing the different floors of the building and corresponding to the floor and additional circuit-controllers, as will be described. The graduated dial or disk $b^{14}$ is made removable, so that it can be replaced at predetermined intervals of time by a new dial, and the said dial in the present instance is adapted to be placed upon a disk $b^\times$, (see Fig. 5,) which is fast on a shaft or arbor $b^{15}$ of a clock mechanism B, (see Fig. 2,) which latter may be of any usual or suitable construction and which is located within the chamber $a'$ of the casing, the shaft or arbor $b^{15}$ of the said clock mechanism being extended through the partition-wall $A^2$. The graduated dial $b^{14}$ is adapted to be held on the disk $b^\times$ by means of a guide-arm $b^{16}$, hinged, as at $b^{17}$, and provided with a finger or thumb piece $b^{18}$, having a suitable hole which enables the guide-arm $b^{16}$ to be fitted over the shaft $b^{15}$. The guide-arm $b^{16}$ is provided with a slot $b^{19}$, made in the arc of a circle having as a center a pivot-pin or arbor $b^{20}$, (shown in Figs. 2 and 6,) the said slot having projecting into it a prick-point or bent finger $b^{70}$ (see Fig. 6) on the end of the marking-rod or stylus $b^{21}$, forming part of the registering mechanism and shown as secured to a stud or arm $b^{22}$, extended through a suitable slot $b^{23}$ (see Fig. 1) in the partition-wall $A^2$ and secured to or forming part of the armature $b^{24}$ of an electromagnet $b^{25}$, secured to and movable with a lever $b^{26}$, located in the chamber $a'$, and provided with the pivot-pin or shaft $b^{20}$, mounted in a suitable bearing-plate $b^{27}$, fastened to the rear wall of the casing A. The armature $b^{24}$ is secured to one end of a suitable spring $b^{71}$, (see Fig. 6,) fastened at its other end to an arm $b^{72}$, extended from the lever $b^{26}$, the said armature normally engaging the free end of a spring $b^{28}$, fastened at its opposite end to a metal plate or bar $b^{29}$, which is secured, as by screws $b^{30}$, (see Fig. 2,) to an insulating-block $b^{31}$, fastened to the arm $b^{72}$ of the lever $b^{26}$ to move with said lever, the arm $b^{29}$ carrying an adjusting-screw or back-stop $b^{32}$ for the spring $b^{28}$.

The lever $b^{26}$ is adapted to be moved in the arc of a circle with the stud $b^{20}$ as a center, in order to place the point $b^{70}$ of the stylus $b^{21}$ in line with the space or graduation on the recording-dial $b^{14}$ corresponding to the floor to be tested, and to effect this result the lever $b^{26}$ is operatively connected, as will now be described, with the pointer or arm $b'$. The connection referred to may and preferably will be made as herein shown, and consists of a link or rod $b^{80}$, joining the lever $b^{26}$ to a lever $b^{81}$, pivoted, as at $b^{82}$, to a plate or bearing $b^{83}$, secured to the rear wall of the casing A. The lever $b^{81}$ is provided at its opposite end with a grooved roller $b^{34}$, (see dotted lines, Fig. 2, and full lines, Fig. 3,) which engages the periphery of a cam-shaped disk $b^{35}$, fast on the shaft $b^2$. The cam-disk $b^{35}$ is suitably shaped to gradually lift the free end of the lever $b^{81}$, and thereby, through the link $b^{80}$, lift the lever $b^{26}$ and move the stylus $b^{21}$ to the desired position with relation to the recording-dial, when the shaft $b^2$ and the cam-disk $b^{35}$ are turned in the direction indicated by the arrow 20, Fig. 2. This rotation of the shaft $b^2$ is effected by turning the pointer or arm $b'$ in the direction indicated by arrow 20, and when the said arm is moved in the direction opposite to that indicated by the arrow 20 the levers $b^{81}$ $b^{26}$ are returned to their normal or starting position by a spring $b^{40}$, represented as fastened to the lever $b^{81}$ and to a stud or screw $b^{41}$. (See Figs. 2 and 3.)

The box or casing A contains within it an electromagnet $d$, (see Figs. 2 and 4,) provided with an armature $d'$, carrying at one end a tablet or visual indicator marked "O. K.," and which indicator is adapted to register with an opening $d^2$ in the partition-wall $A^2$ when the floor-circuits are tested by the operator and found to be in proper working condition. If the floor-circuits tested by the operator are not found to be in proper working condition, the magnet $d$ will not be energized and the "O K" tablet will fail to register with the opening $d^2$, thereby giving a visual indication of the defect in the particular floor-circuit tested. The casing A also contains within it an electromagnet $d^3$, provided with an armature $d^4$, carrying at its outer end a tablet marked "Trouble," which is also preferably located in a vertical line with the opening $d^2$, but below the same, so that when the magnet $d^3$ is energized, as will be described, the trouble dial or indicator will register with the opening $d^2$. The trouble-magnet $d^3$ is designed to be operated only in case of a ground on the line-wires, and the trouble-magnet referred to also controls the local circuit of the registering-magnet $b^{25}$ in conjunction with the ground-key $a^{19}$, as will be described, so that if a ground occurs on the line it will be indicated by the trouble indicator or tablet and also by the registering-magnet $b^{25}$ not responding to the closure of the ground-key, but if no ground exists on the line then the registering-magnet $b^{25}$ will respond and will mark the recording surface or dial $b^{14}$ and make a permanent record that a test has been made for a ground and no ground has been found, and the trouble-magnet will not be energized. The casing A also contains within it, as herein shown, an electromagnet $d^6$, which is designed to control the operation of the bell $d^7$ of an annunciator $d^8$, which latter may be of any suitable or usual construction, such as now commonly employed in hotels, fire-alarm systems, and like places, there being a drop or indicator for each floor-circuit. This indicator may and preferably will be located outside of the casing A. The box or casing also contains within it a fire-alarm-transmitting mechanism $d^{10}$, which may be of any suitable, desired, or usual construction and consisting, as herein shown, (see Figs. 2 and 4,) of a break-wheel $d^{12}$, a coöperating contact-pen $d^{13}$, a clock-movement to operate the break-wheel, and an electromagnet $d^{14}$, controlling the clock-movement, which electromagnet is included in the main-line circuit and may be referred to as the "starting-magnet" for the box movement. In order to avoid energizing the magnet $d^{14}$ when the tests are made, I have provided the apparatus herein shown with a short-circuiting device for the starting-magnet $d^{14}$, which short-circuiting device is represented as mounted upon the shaft $b^2$, and is represented in diagram Fig. 4 as a metallic hub or sleeve $d^{15}$, provided with an axial notch or slot $d^{16}$ in its periphery, with which normally coöperate two contact-pens $d^{17}$ $d^{18}$, connected by the wires $d^{19}$ $d^{20}$ to opposite ends of the coil of the magnet $d^{14}$, as clearly shown in Fig. 4, so that when the movable hub $d^{15}$ is turned with the shaft $b^2$ so as to bring its periphery into contact with the pens $d^{17}$ $d^{18}$ a short circuit for the magnet $d^{14}$ will be completed, which will permit the magnet $d^6$ to be energized without effecting the transmission of the box-number, the magnet $d^6$ having one end of its coil connected by a wire $d^{21}$ to a wire $d^{20}$ and the other end of its coil connected by wire $d^{22}$ to the main-line wire $d^{23}$, as at the point $d^{24}$, the said line-wire being extended beyond the point $d^{24}$ and connected to a contact-pen $d^{25}$, coöperating with a like contact-pen $d^{26}$, connected to the other side of the line-wire $d^{23}$, which, for sake of distinction, will be lettered $d^{27}$.

The contact-pens $d^{25}$ $d^{26}$ coöperate with a circuit-controlling device mounted upon the shaft $b^2$ and consisting, as herein shown, of a hub $d^{28}$, of insulating material, provided with an axially-extended contact strip or tooth $d^{29}$, which normally engages the contact-pens $d^{25}$ $d^{26}$ when the testing arm or pointer $b'$ is in its normal position, (shown in Figs. 1, 2, and 4,) but which is removed from engagement with the contact-pens $d^{25}$ $d^{26}$ when the arm or pointer $b'$ is turned to make a test, thereby bringing the insulating-hub $d^{28}$ in engagement with the contact-arms $d^{25}$ $d^{26}$ and opening the outside or main line $d^{23}$ between these two points.

When the main line is opened by bringing the pointer or arm $d'$ from its normal position into line with one of the openings $b^9$ in the disk $b^8$, as, for instance, the opening marked I in Fig. 1, which may be supposed to be the opening in line with the test-circuit controller for the first floor, the "O K" magnet $d$ is included in circuit with the first floor, and at the same time the annunciator-bell magnet $d^6$ is also included in the circuit, as well as the magnet for the drop of the annunciator $d^8$, indicating the first floor, for each of the stationary members $a^3$ of the test-circuit controllers are connected by separate wires to one end of the magnet-coils controlling the drops for the different floors, while the other ends of the magnet-coils for the drops are connected to a single wire $d^{31}$, joined to one pole of a battery $B^{10}$, having its other pole connected by wire $d^{30}$ to the short-circuiting wire $d^{19}$.

In the present instance I have represented the stationary terminals or members of the test-circuit controllers for floors Nos. 1 and 2 as connected with the corresponding drop-magnets of the annunciator $d^8$, the said stationary terminals being connected to the said magnets by the wires $d^{40}$ $d^{41}$. To complete the circuit of the "O K" magnet $d$ through each of the floor-circuit controllers, the common terminal or member $a^{14}$, coöperating with the movable members $a^4$ of the individual floor-circuit controllers, is connected by the wire $d^{42}$ to one coil of the magnet $d$, the other coil of which is connected by wire $d^{43}$ with the wire $d^{27}$ at the point $d^{44}$. Let it be supposed that the operator has moved the pointer or arm $b'$ so as to place the plunger $b$ in line with the opening $b^9$ indicative of the first floor, and which is marked I in Fig. 1. When the pointer $b'$ is thus placed, the operator presses upon the thumb-piece $b^6$ and pushes the plunger $b$ through the opening $b^9$, (marked I,) and thereby moves the movable terminal $a^4$ of the floor-circuit controller into engagement with the common operating-terminal $a^{14}$ and completes the circuit of the "O K" magnet $d$ and of the bell-magnet $d^6$ through the first-floor circuit, as indicated. This circuit through the first floor may be traced as follows: starting from the positive pole of the battery $B^{10}$ by wire $d^{31}$, through the drop-magnet indicative of the first floor in the annunciator $d^8$, thence by wire $d^{40}$ to the stationary terminal $a^3$ of the first-floor circuit-controller, thence by the first-floor loop $a^{13}$ to the movable terminal $a^4$ of the first-floor circuit-controller, thence by the common coöperating terminal $a^{14}$, wire $d^{42}$, through the magnet $d$, thence by the wire $d^{43}$ to the point $d^{44}$, thence by the main-line wire $d^{27}$ throughout the building to the point $d^{24}$, thence by the wire $d^{22}$ through the magnet $d^6$, thence by the wires $d^{21}$ $d^{20}$, contact-pen $d^{18}$, short-circuiting hub $d^{15}$, contact-pen $d^{17}$, wire $d^{19}$, wire $d^{30}$ to the negative pole of the battery $B^{10}$. If the first-floor circuit is intact, the magnets $d$ and $d^6$ will be energized and the "O K" magnet will attract its armature $d'$ and bring the "O K" tablet into line with the opening $d^2$, while at the same time the local circuit containing the registering-magnet $b^{25}$ will be closed, as will be described, and a registration effected upon the recording surface or dial $b^{14}$.

Figure 4:
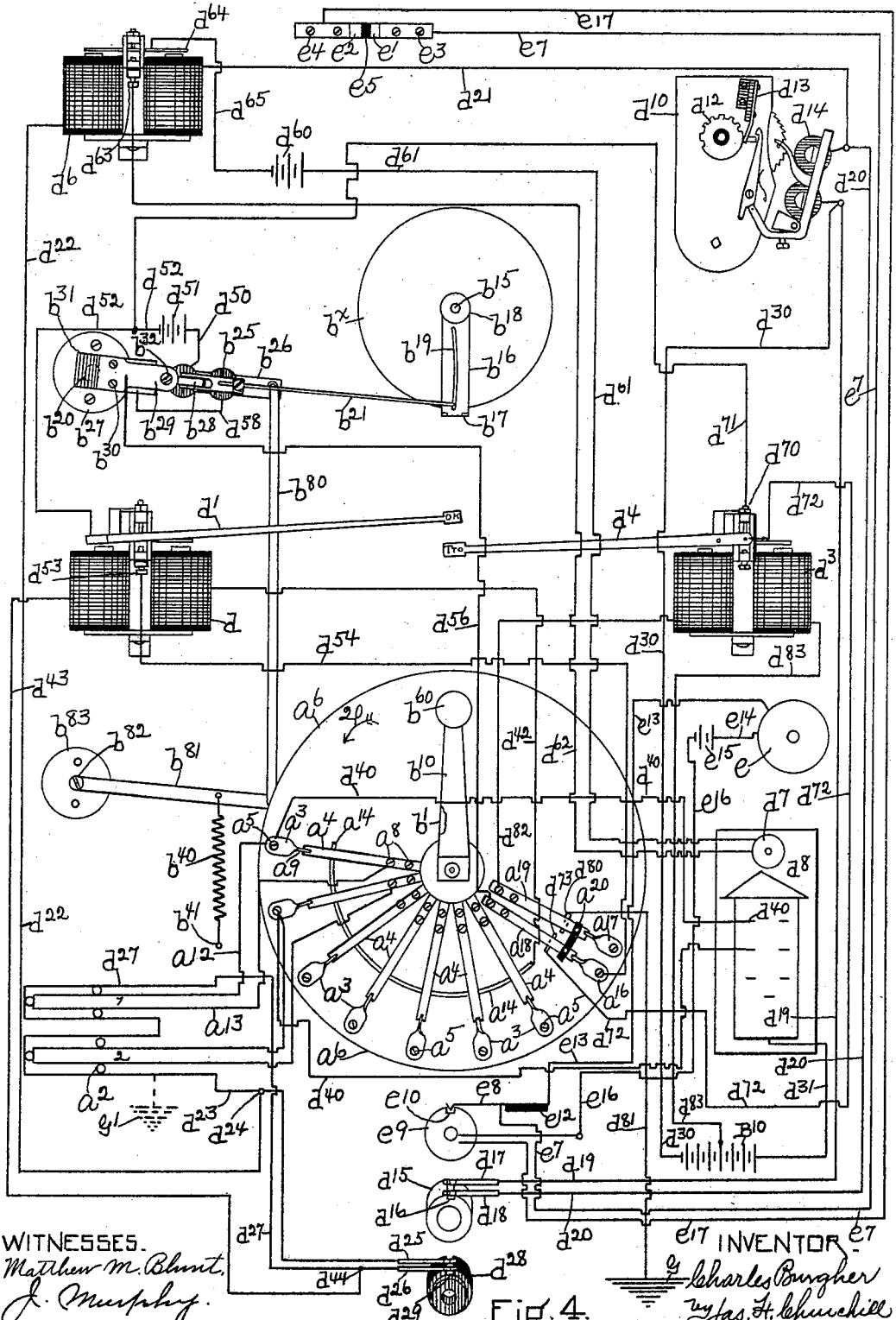

I have previously described how the stylus $b^{21}$, carried by the armature of the registering-magnet $b^{25}$, is moved over the recording-surface into proper position according to which floor is being tested, so that when the registering-magnet $b^{25}$ is energized, as will be described, a puncture or other record will be made on the recording-surface in the circle or space indicative of the first floor. The recording-magnet $b^{25}$ is controlled by the "O K" magnet $d$, so that if the "O K" magnet $d$ responds the registering-magnet will also respond to the closing of the first-floor test-circuit. Referring to Fig. 4, it will be seen that the registering-magnet $b^{25}$ has one end of its coil $d^{50}$ connected to one pole of the battery $d^{51}$, the other pole of which is connected by wire $d^{52}$ to the armature $d'$ of the "O K" magnet, the said armature having coöperating with it a front stop $d^{53}$, to which is connected one end of the wire $d^{54}$, having its other end connected to the stationary member $a^{16}$ of the basement circuit-controller, the movable member $a^{18}$ of the said circuit-controller having connected to it one end of the wire $d^{56}$, the other end of which is electrically connected with the arm $b^{29}$, which is electrically connected by the screw $b^{32}$ and spring $b^{28}$ to the armature $b^{24}$ of the registering-magnet $b^{25}$, the armature $b^{24}$ being connected by the spring $b^{71}$ and arm $b^{72}$ to the lever $b^{26}$, to which the opposite end of the magnet-coil $b^{25}$ is connected by wire $d^{58}$.

The construction of the armature of the registering-magnet is similar to the armature of a vibrating bell, so that when the armature $b^{24}$ is attracted by its magnet $b^{25}$ the circuit of the magnet will be momentarily opened between the armature and the spring $b^{28}$. The magnet $d^6$, as previously described, controls the ringing of the annunciator-bell $d^7$, the magnet of which bell is located in a local circuit containing a battery $d^{60}$, having one pole, herein represented as the positive pole, connected by wire $d^{61}$ to one coil of the magnet of the bell $d^7$, the other coil of which is connected by wire $d^{62}$ with a front stop $d^{63}$ for the armature $d^{64}$ of the magnet $d^6$, the said armature being electrically connected by wire $d^{65}$ with the opposite or negative pole of the battery $d^{60}$, so that when the armature $d^{64}$ is attracted by the energizing of its magnet $d^6$ the local circuit of the battery $d^{60}$ will be closed and the magnet of the bell $d^7$ energized to ring the same. The registering-magnet $b^{25}$ is also adapted to respond to the operation of the ground test-key or circuit-controller and to be operated by the same, if no ground exists on the line, but if a ground does exist on the line the registering-magnet will not be energized, while the trouble-magnet $d^3$ will be energized, and, conversely, if a ground does not exist on the line the trouble-magnet will not be energized, but the registering-magnet will be energized. To effect this converse operation of the registering-magnet, the said magnet is included in a second local circuit, which also includes the battery $d^{51}$ and the armature $d^4$ of the trouble-magnet $d^3$, together with the ground-key, as will now be described.

The armature $d^4$ of the trouble-magnet is provided with a back-stop $d^{70}$, connected by wire $d^{71}$ to the wire $d^{52}$, or it may be directly to the negative pole of the battery $d^{51}$, and the armature $d^4$ of the trouble-magnet $d^3$, which is normally in engagement with the back-stop $d^{70}$, has connected to it one end of the wire $d^{72}$, the other end of which is connected to a circuit-terminal $d^{73}$, (indicated by dotted lines in Fig. 4,) which circuit-terminal is located below and coöperates with the movable member or terminal $a^{18}$ of the ground-key to which the wire $d^{56}$ is connected.

The circuit just described is completed by the movement of the circuit-controller $a^{18}$, so that if the test for a ground is made and no ground exists on the line-circuits the registering-magnet and the "O K" magnet will be energized, the circuit of the registering-magnet through the controller $a^{18}$ being traced as follows: from the positive pole of the battery $d^{51}$ by wire $d^{50}$ through the magnet $d^{25}$, thence by wire $d^{58}$, wire $d^{56}$, circuit-controller $a^{18}$, terminal $d^{73}$, wire $d^{72}$ to the armature $d^{4}$ of the trouble-magnet, thence by the back-stop $d^{70}$, wire $d^{71}$, and wire $d^{52}$ to the negative pole of the battery $d^{51}$. In case of trouble on the line, as, for instance, in case of a ground at the point marked G', Fig. 4, the trouble-magnet $d^{3}$ is energized, while the registering-magnet $b^{25}$ will not be energized. To effect this result, the movable member $a^{19}$ of the ground-testing key has coöperating with it a circuit-terminal $d^{80}$, (indicated by dotted lines, Fig. 4,) which is connected by the wire $d^{81}$ with a constant ground G, and the movable member $a^{19}$ is connected by wire $d^{82}$ to one coil of the trouble-magnet $d^{3}$, which has its other coil connected by a wire $d^{83}$ to a battery, herein shown as with the center pole of the battery $B^{10}$.

Let it be supposed that an accidental ground has come upon the main line $d^{23}$ at the point G' and that the operator is testing for a ground and moves the movable member $a^{19}$ of the ground-circuit controller into contact with the terminal $d^{80}$. In this case the circuit of the trouble-magnet will be completed, and this circuit may be tested as follows: starting from the constant ground G by wire $d^{81}$ to the terminal $d^{80}$, thence by the movable terminal $a^{19}$, wire $d^{82}$, through the trouble-magnet $d^{3}$, thence by wire $d^{83}$ to the battery $B^{10}$, through one-half of the battery to the line $d^{30}$, thence by wire $d^{19}$, contact-pen $d^{17}$, circuit-controller $d^{15}$, pen $d^{18}$, wire $d^{20}$, wire $d^{21}$, through the magnet $d^{6}$, thence by wire $d^{22}$ to the point $d^{24}$, thence by wire $d^{23}$ to the accidental ground G', and thence back to the ground G. The circuit of the trouble-magnet $d^{3}$ is thus completed, and its armature $d^{4}$ is attracted, so as to throw the trouble-indicator into the line with the opening $d^{2}$, and at the same time the circuit of the registering-magnet $b^{25}$ is opened between the back-stop $b^{70}$ and the armature $d^{4}$, so that no registration of the trouble occurs. The casing A is provided with a door A', as previously described, and in order to remind the operator to again close the door after he is through making his test the casing is provided with a circuit-controller which governs the action of an electrically-operated bell $e$, and in the present instance the circuit-controller referred to is shown as two spring arms or terminals $e'$ $e^{2}$, fastened, as herein shown, by screws $e^{3}$ $e^{4}$ to the rear wall of the casing, the said spring-arms being normally separated by a plug $e^{5}$ of insulating material, represented as secured to or forming part of a rod or bar $e^{6}$, (see Fig. 3,) fastened to the door near its top.

The contact-spring $e'$ has connected to it one end of a wire $e^{7}$, having its other end electrically connected, as herein shown, to a pen or brush $e^{8}$, coöperating with a circuit-controlling disk $e^{9}$, fast on the shaft $b^{2}$ and provided with a notch $e^{10}$ in its periphery, with which notch the contact-pen $e^{8}$ normally coöperates, so as to open the circuit between the said pen and disk $e^{9}$. The contact-pen $e^{8}$ is represented in Fig. 4 as secured to an insulating block or support $e^{12}$, and the said contact-pen has connected to it one end of a wire $e^{13}$, having its other end connected to one coil of the magnet controlling the bell $e$, the other end of the coil of the said magnet being connected by a wire $e^{14}$ to one pole of a battery $e^{15}$, having its other pole electrically connected by wire $e^{16}$ to the shaft $b^{2}$, and thereby to the disk $e^{9}$. The shaft $b^{2}$ and the disk $e^{9}$ have electrically connected to them one end of the wire $e^{17}$, which is electrically connected to the spring contact-arm $e^{2}$. When the door A' is opened, the insulating-plug is withdrawn from engagement with the spring contact arms or terminals $e'$ $e^{2}$ and the latter come together and close the circuit of the magnet controlling the bell $e$, which circuit may be traced as follows: from the positive pole of the battery $e^{15}$ by wire $e^{14}$, through the magnet of the bell $e$, thence by the wire $e^{13}$ to the contact-pen $e^{8}$, thence by wire $e^{7}$ to the contact-spring $e'$, thence by the contact-spring $e^{2}$ and wire $e^{17}$ to the shaft $b^{2}$ or disk $e^{9}$, thence by the wire $e^{16}$ to the negative pole of the battery. It will thus be seen that as long as the door remains open and the circuit-controller composed of the spring-arms $e'$ $e^{2}$ is closed the bell $e$ will continue to ring, so that when the operator has completed his tests he will be reminded to shut the door, which in practice will be provided with a suitable lock and key to prevent unauthorized tampering with the testing apparatus.

In order to prevent the operator leaving the pointer or actuating-arm $b'$ in any other than the normal or starting position after making a test, the circuit-controller $e^{9}$ on the shaft $b^{2}$ is provided, which circuit-controller for the local bell $e$ is brought into operation as soon as the pointer $b'$ has been moved from its normal position, and this circuit may be traced as follows: from the positive pole of the battery $e^{15}$ by wire $e^{14}$, through the magnet of the bell $e$, thence by wire $e^{13}$ to the contact-pen $e^{8}$, thence through the disk $e^{9}$, shaft $b^{2}$, and wire $e^{16}$ back to the negative pole of the battery $e^{15}$.

The circuit of the bell just described is normally open, as represented in Fig. 4, but becomes closed as soon as the pointer $b'$ is moved from its normal position, so that the bell will continue to ring if the operator should manually open the circuit of the bell $e$ between the contact-pens $e'$ $e^2$, as by the insertion of a pencil or other piece of insulating material. As a result of this construction it follows that the operator is reminded to return the pointer $b'$ into its normal position, and when in its normal position the main lines $d^{23}$ $d^{27}$ are closed between the pens $d^{25}$ $d^{26}$. In order to obtain a record of the opening and closing of the door A', I have provided the casing with a spring-actuated plunger $f$, (shown in Figs. 2 and 5,) carrying the knife $f'$, which is movable in a suitable slot in a sleeve or tube $f^2$, carrying the plunger, the said knife moving through a slot $f^3$ in guide-plates $f^4$ $f^5$, between which the dial $d^{14}$ is made to travel. The spring-actuated plunger $f$ is normally compressed by the door when the latter is closed, but as soon as the door is open the plunger $f$ is thrown outward beyond its normal position by its spring $f^6$, (see Fig. 5,) so that when the door is again closed the plunger will be forced in toward the back of the casing and will cut or otherwise mark the dial $b^{14}$ on both movements and thus establish a record of the number of times the door is opened and closed, and also, by reason of the dial, the time at which it is closed.

I claim—

1. In a testing apparatus, the combination of the following instrumentalities, viz: an inclosing case provided with a door, a recording-surface located within said case, a stylus or marking device coöperating therewith, an electromagnet to operate said stylus, a plurality of circuit-controllers located in said casing and each included in an independent circuit, a circuit-terminal coöperating with the circuit-controllers, an electromagnet included in circuit with the said circuit-terminal, a disk or dial having openings in line with the said circuit-controllers, and a movable arm or pointer provided with a plunger or arm adapted to enter said openings and move one member of the said circuit-controllers into engagement with the said circuit-terminal, substantially as described.

2. In a testing apparatus, the combination of the following instrumentalities, viz: an inclosing case, a recording-surface located therein, a stylus or marking device coöperating with said surface, a registering-electromagnet to operate said stylus, an electromagnet controlling the operation of the registering-magnet, a plurality of circuit-controllers, each provided with a movable member, a circuit-terminal coöperating with the said movable members and included in circuit with the electromagnet controlling the registering-magnet, a movable pointer or arm, mechanism connected to said pointer and to the registering-magnet to effect the proper positioning of the stylus with relation to the recording-surface when the said pointer is moved, and means to effect the operation of the magnet controlling the registering-magnet, substantially as described.

3. In a testing apparatus, the combination of the following instrumentalities, viz: an inclosing case, a recording-surface located therein, a stylus or marking device coöperating with said surface, a registering-electromagnet to operate said stylus, an electromagnet controlling the operation of the registering-magnet, a plurality of circuit-controllers, each provided with a movable member, a circuit-terminal coöperating with the said movable members and included in circuit with the electromagnet controlling the registering-magnet, a movable pointer or arm, mechanism connected to said pointer and to the registering-magnet to effect the proper positioning of the stylus with relation to the recording-surface when the said pointer is moved, an additional circuit-controller provided with two movable members insulated from each other, a trouble-electromagnet included in circuit with one of said movable members, an armature for said trouble-magnet controlling in part the circuit of the registering-magnet, a circuit-terminal coöperating with one of said movable members and connected in circuit with the armature of the trouble-magnet, and a second circuit-terminal coöperating with the second movable member and connected to the ground, substantially as described.

4. In a testing apparatus, the combination of the following instrumentalities, viz: a recording-surface, a stylus or marking device coöperating therewith, an electromagnet to operate said stylus, a plurality of circuit-controllers normally closed and forming part of the circuits to be tested, a circuit-terminal coöperating with the movable members of said circuit-controllers, an electromagnet connected in circuit with said terminal and governing the operation of the registering-magnet, and means to operate the movable members of the said circuit-controllers, substantially as described.

5. In a testing apparatus, the combination of the following instrumentalities, viz: a recording-surface, a stylus or marking device coöperating therewith, an electromagnet to operate said stylus, a movable support for the said electromagnet, a movable pointer or arm operatively connected to said support to move the same, a plurality of circuit-controllers provided with movable members adapted to be operated by the movable arm or pointer, a circuit-terminal coöperating with said movable members, an electromagnet connected in circuit with said circuit-terminal and adapted to be included in circuit with said circuit-controllers, and an armature for said electromagnet governing the operation of the registering-magnet, substantially as described.

6. In a testing apparatus, the combination of the following instrumentalities, viz: a recording-surface, a stylus or marking device coöperating therewith, an electromagnet to operate said stylus, a movable support for the said electromagnet, a movable pointer or arm operatively connected to said support to move the same, a plurality of circuit-controllers provided with movable members adapted to be operated by the movable arm or pointer, a circuit-terminal coöperating with said movable members, an electromagnet connected in circuit with said circuit-terminal and adapted to be included in circuit with said circuit-controllers, and an armature for said electromagnet governing the operation of the registering-magnet, and a visual indicator also governed by said armature, substantially as described.

7. In a testing apparatus, the combination of the following instrumentalities, viz: a recording-surface, a stylus or marking device coöperating therewith, a registering-magnet to operate said stylus, a movable support for said registering-magnet, a rotating shaft operatively connected with the movable support to effect the movement of the same, a pointer mounted upon said shaft, a plunger carried by said pointer, a plurality of circuit-controllers normally included in the circuits to be tested and provided with movable members, a circuit-terminal coöperating with the said movable members, an electromagnet connected in circuit with the circuit-terminal, an armature for said electromagnet controlling the operation of the registering-magnet, a second electromagnet included in circuit with the circuit-terminal and adapted to be energized by the engagement of the movable member of the circuit-controller with the said circuit-terminal, and an audible signal controlled by the said electromagnet, substantially as described.

8. In a testing apparatus, the combination of the following instrumentalities, viz: a recording-surface, a stylus or marking device coöperating therewith, an electromagnet to operate said stylus, a circuit-controller provided with two movable members insulated from each other, one of which is included in circuit with the said registering-magnet, a trouble-electromagnet connected to the other movable member of the circuit-controller, independent circuit-terminals coöperating with the said movable members, one of which is connected in circuit with the registering-magnet and the other of which is connected with the ground, an armature for said electromagnet normally included in circuit with the registering-magnet, whereby the engagement of the movable members of the circuit-controller with their coöperating terminals may effect the energizing of the registering-magnet in the absence of a ground on the circuits to be tested, and may effect the energizing of the trouble-electromagnet in case of a ground on the circuit to be tested, substantially as described.

9. In a testing apparatus, the combination of the following instrumentalities, viz: an inclosing case provided with a door, a circuit-controller located in said case and consisting of circuit-terminals and an insulated movable member, an audible signal controlled by said circuit-terminals and normally inactive when the door is closed but adapted to become active when the door is opened, a rotatable shaft, a circuit-controller governed by said shaft and controlling the operation of the audible signal independent of the first-mentioned circuit-controller, whereby the audible signal may be maintained operative when the shaft is rotated irrespective of the condition of the first circuit-controller, substantially as described.

10. In a testing apparatus, the combination of the following instrumentalities, viz: an inclosing case, a movable recording-surface located therein, a stylus or marking device coöperating with the said recording-surface, a registering-electromagnet to operate said stylus, a movable support for said registering-magnet, a rotating shaft, a cam mounted on said shaft, mechanism connected to said movable support and operated by the said cam to properly position the marking-stylus with relation to the recording-surface, a pointer or arm fast on the said shaft, a plunger carried by said pointer, a plurality of circuit-controllers provided with movable members adapted to be individually operated by said plunger, a circuit-terminal coöperating with the movable members, an electromagnet connected with said circuit-terminal and included in circuit with the circuits to be tested, an armature for said electromagnet governing the operation of the registering-magnet, substantially as described.

11. In a testing apparatus, the combination of the following instrumentalities, viz: an inclosing case, a movable recording-surface located therein, a stylus or marking device coöperating with the said recording-surface, a registering-electromagnet to operate said stylus, a movable support for said registering-magnet, a rotating shaft, a cam mounted on said shaft, mechanism connected to said movable support and operated by the said cam to properly position the marking-stylus with relation to the recording-surface, a pointer or arm fast on the said shaft, a plunger carried by said pointer, a plurality of circuit-controllers provided with movable members adapted to be individually operated by said plunger, a circuit-terminal coöperating with the movable members, an electromagnet connected with said circuit-terminal and included in circuit with the circuits to be tested, an armature for said electromagnet governing the operation of the registering-magnet and a visual indicator also operated by said armature, substantially as described.

12. In a testing apparatus, the combination of the following instrumentalities, viz: an inclosing case, a movable recording-surface located therein, a stylus or marking device coöperating with said recording-surface, a registering-electromagnet to operate said stylus, a movable support for said registering-magnet, a rotating shaft, a cam mounted on said shaft, mechanism connected to said movable support and operated by the said cam to properly position the marking device or stylus with relation to the recording-surface, a pointer or arm fast on the said shaft, a plunger carried by said pointer, a plurality of circuit-controllers provided with movable members adapted to be individually operated by said plunger, a circuit-terminal coöperating with the movable members, an electromagnet connected with said circuit-terminal and included in circuit with the circuits to be tested, an armature for said electromagnet governing the operation of the registering-magnet and of a visual indicator, an audible signal, an electromagnet in circuit with the said circuit-terminal and controlling the said audible signal, a signal-transmitting mechanism located in said case, a circuit-controller for said signal-transmitting mechanism mounted on the said shaft and adapted to short-circuit the said signal-transmitting mechanism, an independent circuit-controller comprising two movable members insulated from each other and adapted to be operated by the said plunger, independent circuit-terminals coöperating with said movable members, one of the said movable members being connected with the registering-magnet, a trouble-electromagnet connected to the other of the said movable members, a ground connected to one of the circuit-terminals for said movable members, an armature for the trouble-magnet connected in circuit with the other terminal for the said movable members and normally connected in circuit with the registering-magnet, substantially as described.

In testimony whereof I have signed my name to this specification in the presence of two subscribing witnesses.

CHARLES BURGHER.

Witnesses:
   JAS. H. CHURCHILL,
   J. MURPHY.